Jan. 8, 1952            A. D. SLATKIN           2,581,608
ELECTRIC VULCANIZING MACHINE
Filed May 28, 1948                         2 SHEETS—SHEET 1
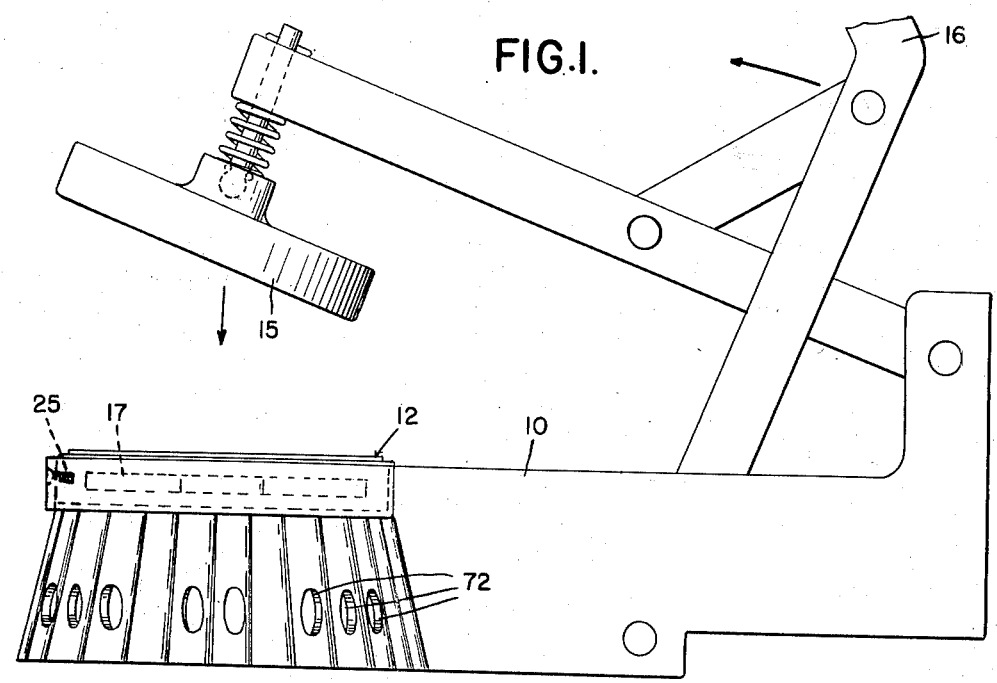
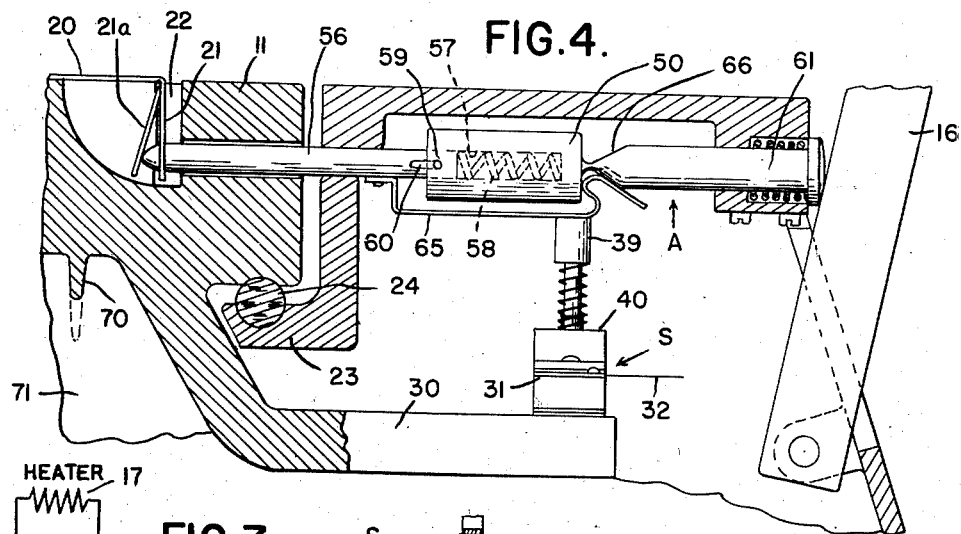
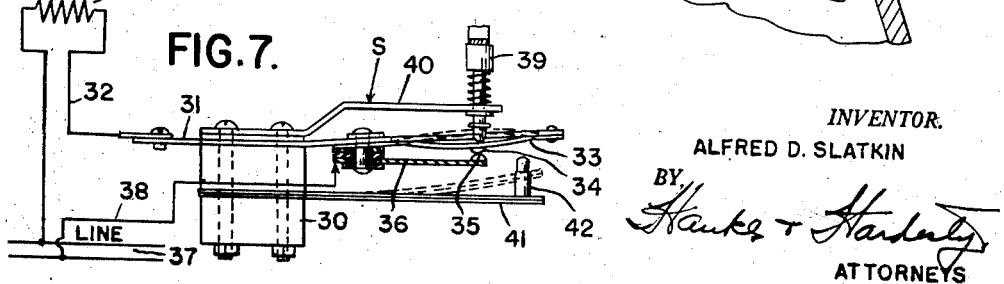
INVENTOR.
ALFRED D. SLATKIN
BY
Hauke & Hardesty
ATTORNEYS Jan. 8, 1952 A. D. SLATKIN 2,581,608
ELECTRIC VULCANIZING MACHINE
Filed May 28, 1948 2 SHEETS—SHEET 2

INVENTOR.
ALFRED D. SLATKIN
BY Hawks & Hardesty
ATTORNEYS

Patented Jan. 8, 1952

2,581,608

UNITED STATES PATENT OFFICE 2,581,608

ELECTRIC VULCANIZING MACHINE

Alfred D. Slatkin, Birmingham, Mich.

Application May 28, 1948, Serial No. 29,726

9 Claims. (Cl. 18—18)

This invention relates to a vulcanizing machine more particularly applicable for vulcanizing a patch to an inner tube of an automobile tire or for repairing any other rubber article.

The methods as presently employed, utilize in general a constant temperature to vulcanize rubber and rubber compounds, or in the application of hot tire patches to inner tubes as presently practiced, the rubber patch is carried on the bottom of a cup in which a powder is placed, which powder is ignited to quickly melt the rubber and which is allowed to cool to complete the vulcanization of the patch to the tube. In this method there is no control of the curing and as a result, many of these so-called hot patches are not satisfactory.

Another object of my invention is to provide a more satisfactory vulcanized article, more particularly applicable to the vulcanizing of a tire patch to an inner tube of a vehicle tire; by constructing a machine which is readily operated and so controlled in operation as to provide for a controlled temperature rise and fall in completing the full cycle of the vulcanizing process.

A still further object of my invention is to provide for more efficient vulcanizing and to insure the proper use of the correct parts by constructing a vulcanizing machine adapted for co-operative operation with a tire patch of a construction which provides for a control of the machine. In fact, the usual form of tire patch will not work in my machine, as this novel patch itself actually controls the operation of the machine, as without my specially designed patch, it is impossible to operate the machine.

The above is accomplished by using a specially designed switch, which is mechanically tripped to close the electrical circuit to the heating element carried by the machine for applying heat to the patch and operated in response to a thermal condition in the machine to break the same electrical circuit.

Figure 2:
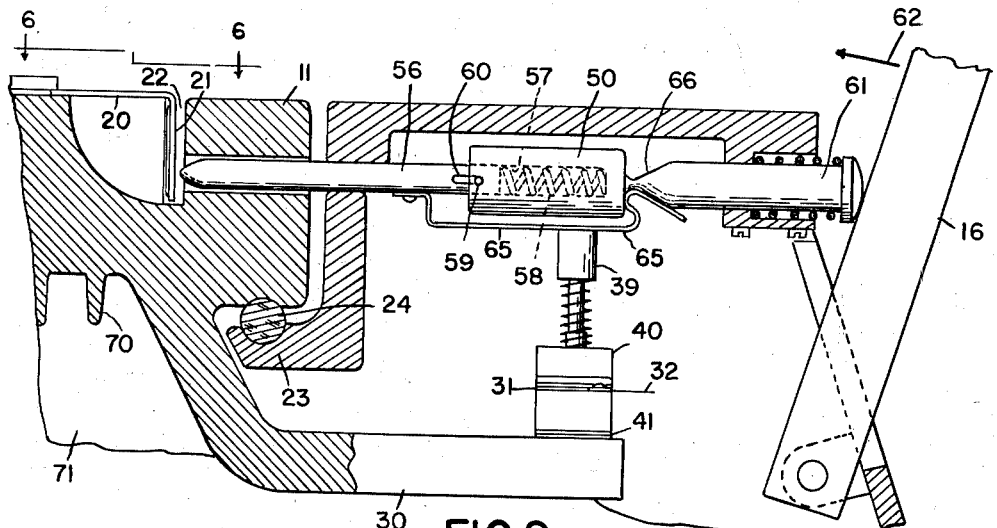
Figure 3:
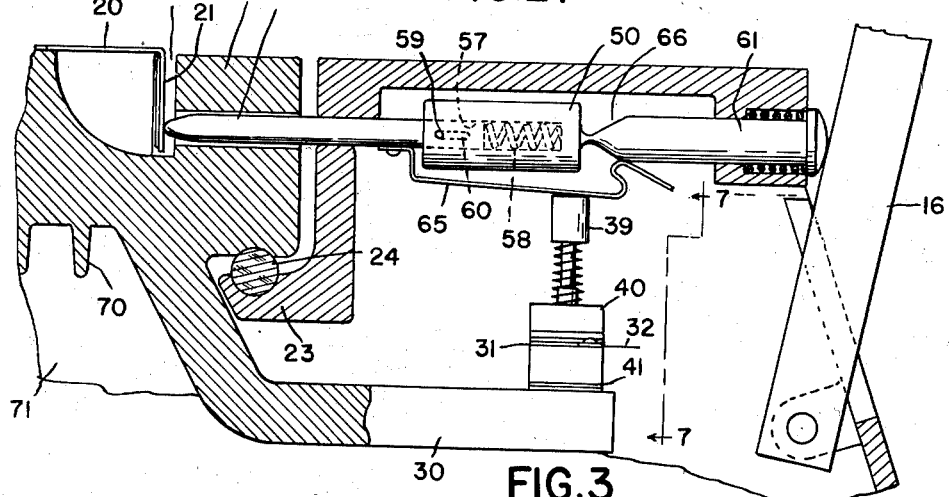
Figures 5, 6:
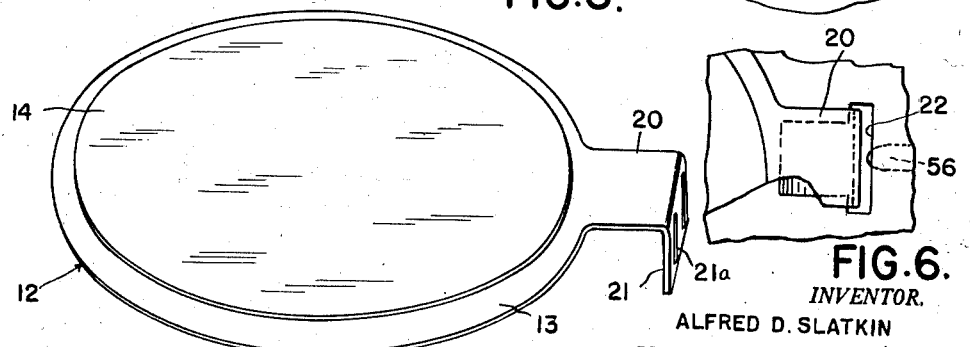

For a more detailed understanding of my invention reference may be had to the preferred embodiment thereof wherein like characters refer to like parts throughout the several views, and in which:

Fig. 1 is a side elevational view of a vulcanizing machine,

Fig. 2 is a fragmentary longitudinal sectional view through the machine showing the switch means, Fig. 3 is a similar sectional view showing the switch being actuated to close the electrical circuit to the heater, Fig. 4 is another similar sectional view showing the striker punched through the ear on the tire patch, and showing the switch actuator retracted, Fig. 5 is a perspective view of the tire patch, Fig. 6 is a fragmentary plan view as seen from line 6—6 of Fig. 2, and Fig. 7 is an elevational view of the switch mechanism as seen from the line 7—7 of Fig. 3.

In the accompanying drawings I have illustrated a portable vulcanizing machine incorporating the principles of my invention and comprising a frame structure 10, which supports the tire patch supporting element 11 on which is laid a tire patch 12 preparatory to vulcanizing the same onto a rubber inner tube of a vehicle tire, or other rubber article which is to be repaired.

The tire patch, which is composed of a sheet metal disc or other suitable carrier 13 and a rubber patch 14 cemented thereon, is laid onto this tire patch support 11 and a clamp 15 actuated by means of a handle 16 is forced onto the tire patch after the tube or other rubber article to be repaired is laid thereon.

The patch support 11 is provided with a conventional electrical resistance element forming a heater 17, which when turned on, serves to rapidly raise the temperature of this support plate 11 and the heat is transmitted directly therefrom to the tire patch for vulcanizing same to the tube.

This particular type of tire patch is provided with an extension 20 terminating in a downturned ear 21 which is constructed to fit into the recess 22 formed into the support plate 11, as more clearly illustrated in Figs. 2 and 6.

The support frame 10 is constructed to support the tire patch supporting plate 11 in any conventional manner, and one way in which this can be done is to provide a flange 23 which carries an insulating gasket 24 on which the support plate 11 rests. Preferably the support plate is bolted or otherwise secured to the frame 10 by means of screws 25 or other suitable fastening devices.

The support plate 11 carries a downwardly and laterally projecting arm 30 which carries a suitable switching mechanism S and the frame structure 10 supports a suitable switch actuating mechanism A which may be actuated by arm 16.

The present switch, as illustrated herein, is a standard re-set switch embodying a breaker which is thermal responsive. This switch provides a contact bar 31, which in turn carries a snap-over disc or spring 33, said spring 33 being provided with a contact 34 arranged to make contact with another contact 35 carried by a contact arm 36, connected with the power line 37, by means of a wire connector 38. The switch button 39 is supported by an arm 40 and may be depressed in such a way as to engage the snap-over spring contact 33 and move same from the dotted line position to the full line position as shown in Fig. 7, bringing the contacts 34 and 35 together to close the electrical circuit to the heater.

As the support plate heats up, the heat is conducted directly to the bi-metal thermal responsive lever 41 which carries a button 42, and as same is heated by reason of the heat conducted directly thereto by arm 30, the same will distort and assume the position shown in dotted lines, at which time the button 42 engages the snap-over spring 33 and snaps it back to the dotted line position. The button switch 39 is spring pressed to always return same to its original position after it has actuated this snap-over spring element 33.

The switch actuating mechanism comprises a two-part structure consisting of a plunger 50 and a striker 56, said striker being supported in the drilled hole or recess in the plunger and abutting a spring 58 which yieldingly urges the striker outwardly of the plunger. However, the striker is preferably held in position by means of a pin 59 engaging in a slot 60 carried in the striker.

In Fig. 2 the arm 16 is just engaging the end 61 of the plunger and continued movement of the arm 16 in the direction as shown by arrow 62 advances the plunger into a position shown in Fig. 3 and the striker is forced inwardly of the hole or recess 57, compressing spring 58 by reason of the fact that the outer end of the striker abuts the down-turned ear 21 carried by tire patch 12 which has been inserted in the slot 22. The resistance to fracture of ear 21 is sufficient to provide for a definite relative travel of said striker with respect to the plunger, until the increased pressure of spring 58 is enough to cause the said striker to break or fracture the ear 21.

The final movement of the arm 16 in clamping the clamp 15 onto the tire patch builds up such a compression in spring 58, that the spring force against the striker will cause same to push through the central portion 21A of the ear 21 or otherwise distort the ear, allowing the striker to advance into the position shown in Fig. 4.

The striker carries a spring switch actuator 65 which comprises a spring element terminating in a return bent or other detent which normally lies against the cam surface 66, carried by the plunger 50. As the striker moves inwardly of the hole 57, this spring actuator 65 is cammed into the position shown in Fig. 3 and since the button 39 of the switch is normally arranged to abut the spring actuator, the movement of same will move the switch button to close the switch contacts 34 and 35. After this switch has been closed, the tire patch support plate 11 begins to heat up because of the heater being turned on, and since the final movement of clamping the tire patch and tube together on the support plate 11 has resulted in making the striker distort the ear, allowing the striker and plunger to separate and return to a normal position, the actuator 65 is thus moved relative to the cam 66 or retracted to a position as shown in Fig. 2, thus releasing the switch button 39 allowing it to return to its original position; and thereby making it possible for the spring contact element 33 to break the circuit when the support plate is heated to a predetermined temperature, causing the button 42 to move the element 33 past center and to snap same to an "off" position.

The completion of the vulcanizing of the tire patch is most satisfactorily had if the curing of the tire patch is carried out with a controlled temperature. I have found that most satisfactory results are had by curing the rubber when subjected to a controlled heat of diminishing temperature. Usually the curing period is from three to five minutes and I have so designed the support plate 11 with fins 70 which project into the air chamber 71 underneath the support plate to properly control the dissipation of heat from the support plate, and with suitable vents 72 in the supporting frame, which communicate with the air space 71, controlling the circulation of air through the air space 71, to control the radiation of the heat, and thus thereby accurately control the rate of temperature drop to effect the most satisfactory curing of the tire patch onto the rubber tube or other rubber article which is being repaired.

While I have illustrated but one form of my invention and shown in detail but one embodiment thereof, it will be readily apparent that various changes and modifications in the structure may be made without departing from the spirit of invention as set forth in the appended claims.

I claim:

1. In a tire patch vulcanizing machine, a tire patch support member provided with an electric heating element, a switch means for controlling the electric circuit to said heating means and including a thermal responsive means for opening said switch, an extension carried by said support member and providing a support for said switch means and constructed to conduct heat from said support member to said thermal responsive means, said extension constructed with a predetermined cross section to mechanically control the rate of heat conduction to said thermal responsive means for controlling the time said switch means remains closed, and mechanical devices associated with the tire patch support for controlling the dissipation of heat therefrom to control the rate of cooling of said tire for effecting a curing of the tire patch under a controlled diminishing heat.

2. In a tire patch vulcanizing machine, a tire patch support on which a tire patch is directly supported for vulcanizing to a tire or other rubber member, means for heating said tire patch support to a predetermined temperature, thermal responsive means to cut off the heat to said tire patch support, said tire patch support constructed to control the dissipation of heat from said support while cooling, and a housing for said support and defining an air space underneath the support, said housing having vent openings controlling circulation of air through said space to control radiation of heat from said space whereby to effect a curing of said tire patch under a controlled diminishing temperature drop.

3. A tire patch vulcanizing machine comprising a frame structure, a tire patch support member carried by the frame structure and provided with a heating element, a switch of the type comprising a mechanically actuated spring biased switch mechanism, a spring returned switch button operable to actuate said mechanism to close the switch and electric circuit to the heating element and a thermal responsive means for opening said switch mechanism, clamping means for clamping a tire tube on said patch under pressure, means for actuating said clamping means, and switch actuating means operated by the clamp actuating means for actuating the mechanically actuated spring biased switch mechanism, said last mentioned means comprising a spring biased member, a spring biased actuator carried by said member and moved to actuate said switch button to close the switch, said actuator and switch button being retracted after closing the switch, and said thermal responsive means being subsequently actuated to actuate the spring biased switch mechanism to open said switch.

4. A tire patch vulcanizing machine comprising a frame structure, a tire patch support member carried by the frame structure and provided with a heating element, said member provided with a recess receiving an ear carried by said tire patch, a switch of the type comprising a mechanically actuated spring biased switch mechanism, a spring returned switch button operable to actuate said mechanism to close the switch and electric circuit to the heating element, and a thermal responsive means for opening said switch mechanism, clamping means for clamping a tire tube on said patch under pressure, means for actuating said clamping means, and switch actuating means operated by the clamp actuating means for actuating the mechanically actuated switch mechanism, said last mentioned means comprising a plunger guided by said frame structure, a striker yieldingly carried by said plunger and positioned in substantially abutting contact with the ear carried by said tire patch, and a spring biased actuator carried by said striker and engaging said plunger, said actuator being moved when relative movement of said plunger and striker takes place to actuate said switch button to close the switch, said actuator and switch button being spring retracted after closing the switch, and said thermal responsive means being subsequently operable to actuate the spring biased switch mechanism to open said switch.

5. A tire patch vulcanizing machine comprising a frame structure, a tire patch support member carried by the frame structure and provided with a heating element, said member provided with a recess receiving an ear carried by said tire patch, a switch of the type comprising a mechanically actuated spring biased switch means, a spring returned switch button operable to actuate said mechanism to close the switch and electric circuit to the heating element, and a thermal responsive means for opening said switch mechanism, clamping means for clamping a tire tube on said patch under pressure, means for actuating said clamping means, and switch actuating means operated by the clamp actuating means for actuating the mechanically actuated switch mechanism, said last mentioned means comprising a plunger guided by said frame structure, a striker yieldingly axially slidably carried by said plunger and positioned in substantially abutting contact with the ear carried by said tire patch, and a spring biased actuator carried by striker and engaging said plunger, said actuator being moved when relative contracting sliding movement of said plunger takes place to actuate said switch button to close the switch, said striker being subsequently advanced to distort the ear of said tire patch, said actuator and switch button being spring retracted after closing the switch, and said thermal responsive means being subsequently operable to actuate the spring biased switch mechanism to open said switch.

6. A tire patch vulcanizing machine comprising a frame structure, a tire patch support member carried by the frame structure and provided with a heating element, said member provided with a recess receiving an ear carried by said tire patch, a switch of the type comprising a mechanically actuated spring biased switch mechanism, a spring returned switch button operable to actuate said mechanism to close the switch and electric circuit to the heating element, and a thermal responsive means for opening said switch mechanism, clamping means for clamping a tire tube on said patch under pressure, means for actuating said clamping means, and switch actuating means operated by the clamp actuating means for actuating the mechanically actuated spring biased switch mechanism, said last mentioned means comprising a plunger guided by said frame structure and provided with a cam surface, a striker yieldingly slidably supported by said plunger and positioned in substantially abutting contact with the ear carried by said tire patch, and a spring biased actuator carried by said striker and engaged with the cam surface, said actuator being moved by reason of the relative contracting sliding movement of said striker and plunger causing the actuator to ride on said cam surface, whereby to depress the switch button and actuate the switch mechanism to close the electrical circuit to said heater, and means to further actuate said striker to advance same and distort the ear of said tire patch to relatively separate said plunger and striker and to thus disengage said spring biased actuator from said cam surface, said actuator and switch button being spring retracted after closing the switch, and said thermal responsive means being subsequently actuated to actuate the spring biased switch mechanism to open said switch.

7. A tire patch vulcanizing machine comprising a frame structure, a tire patch support member carried by the frame structure and provided with a heating element, said member provided with a recess receiving an ear carried by said tire patch, a switch of the type comprising a mechanically actuated spring biased switch mechanism, a spring returned switch button operable to actuate said mechanism to close the switch and electric circuit to the heating element, and a thermal responsive means for opening said switch mechanism, clamping means for clamping a tire tube on said patch under pressure, means for actuating said clamping means, and switch actuating means operated by the clamp actuating means for actuating the mechanically actuated spring biased switch mechanism, said last mentioned means comprising a plunger guided by said frame structure and provided with a cam surface, a striker yieldingly slidably supported by said plunger and positioned in substantially abutting contact with the ear carried by said tire patch, and a spring biased actuator carried by said striker and engaged with the cam surface, said actuator being moved by reason of the relative contracting sliding movement of said striker and plunger causing the actuator to ride on said cam surface, whereby to depress the switch button and actuate the switch mechanism to close the electrical circuit to said heater, and means to further actuate said striker to advance same and distort the ear of said tire patch to relatively separate said plunger and striker and to thus disengage said spring biased actuator from said cam surface, said actuator and switch button being spring retracted after closing the switch, and said thermal responsive means being subsequently operable to actuate the spring biased switch mechanism to open said switch, said striker and plunger being connected with a slot and pin construction permitting only a limited relative movement between said striker and plunger.

8. A tire patch vulcanizing machine comprising a frame structure, a tire patch support member carried by the frame stucture and provided with a recess receiving an ear carried by said tire patch, a switch of the type comprising a mechanically actuated spring biased switch mechanism, a spring returned switch button operable to actuate said mechanism to close the switch and electric circuit to the heating element, and a thermal responsive means for opening said switch mechanism, clamping means for clamping a tire tube on said patch under pressure, means for actuating said clamping means, and switch actuating means operated by the clamp actuating means for actuating the mechanically actuated spring biased switch mechanism, said last mentioned means comprising a plunger guided by said frame structure and provided with a cam surface, a striker yieldingly slidably supported by said plunger and positioned in substantially abutting contact with the ear carried by said tire patch, and a spring biased actuator carried by said striker and engaged with the cam surface, said actuator being moved by reason of the relative contracting sliding movement of said striker and plunger causing the actuator to ride on said cam surface, whereby to depress the switch button and actuate the switch mechanism to close the electrical circuit to said heater, and means to further actuate said striker to advance same and distort the ear of said tire patch and to thus relatively separate said plunger and striker and to thus disengage said spring biased actuator from said cam surface, said actuator and switch button being spring retracted after closing the switch, and said thermal responsive means being subsequently operable to actuate the spring biased switch mechanism to open said switch, and means returning said switch actuating means to its original position on release of said clamp actuating means.

9. A tire patch vulcanizing machine comprising a frame structure, a tire patch support member carried by the frame structure and provided with a heating element, said member provided with a recess receiving an ear carried by said tire patch, a switch of the type comprising a mechanically actuated spring biased switch mechanism, a spring returned switch button operable to actuate said mechanism to close the switch and electric circuit to the heating element, and a thermal responsive means for opening said switch mechanism, clamping means for clamping a tire tube on said patch under pressure, means for actuating said clamping means, and switch actuating means operated by the clamp actuating means for actuating the mechanically actuated switch mechanism, said last mentioned means comprising a plunger guided by said frame structure and provided with a cam surface, a striker yieldingly slidably supported by said plunger and positioned in substantially abutting contact with the ear carried by said tire patch, and a spring biased actuator carried by said striker and engaged with the cam surface, said actuator being moved by reason of the relative contracting sliding movement of said striker and plunger causing the actuator to ride on said cam surface, whereby to depress the switch button and actuate the switch mechanism to close the electrical circuit to said heater, and means to further actuate said striker to advance same to distort the ear of said tire patch to relatively separate said plunger and striker and to thus disengage said spring biased actuator from said cam surface, said actuator and switch button being spring retracted after closing the switch, and said thermal responsive means being subsequently operable to actuate the spring biased switch mechanism to open said switch, said plunger provided with a shoulder, said spring biased actuator having a return bent portion engaging said shoulder, whereby retraction of said plunger retracts said striker.

ALFRED D. SLATKIN.

REFERENCES CITED

The following references are of record in the file of this patent:

UNITED STATES PATENTS

| Number | Name | Date |
| --- | --- | --- |
| 1,628,899 | Murphy | May 17, 1927 |
| 2,082,551 | Raney | June 1, 1937 |
| 2,099,499 | Raney | Nov. 16, 1937 |
| 2,148,407 | Pierson | Feb. 21, 1939 |
| 2,356,649 | Bucher | Aug. 22, 1944 |
| 2,426,767 | Dupont | Sept. 2, 1947 |

FOREIGN PATENTS

| Number | Country | Date |
| --- | --- | --- |
| 449,376 | Great Britain | June 25, 1936 |